Figure 1:
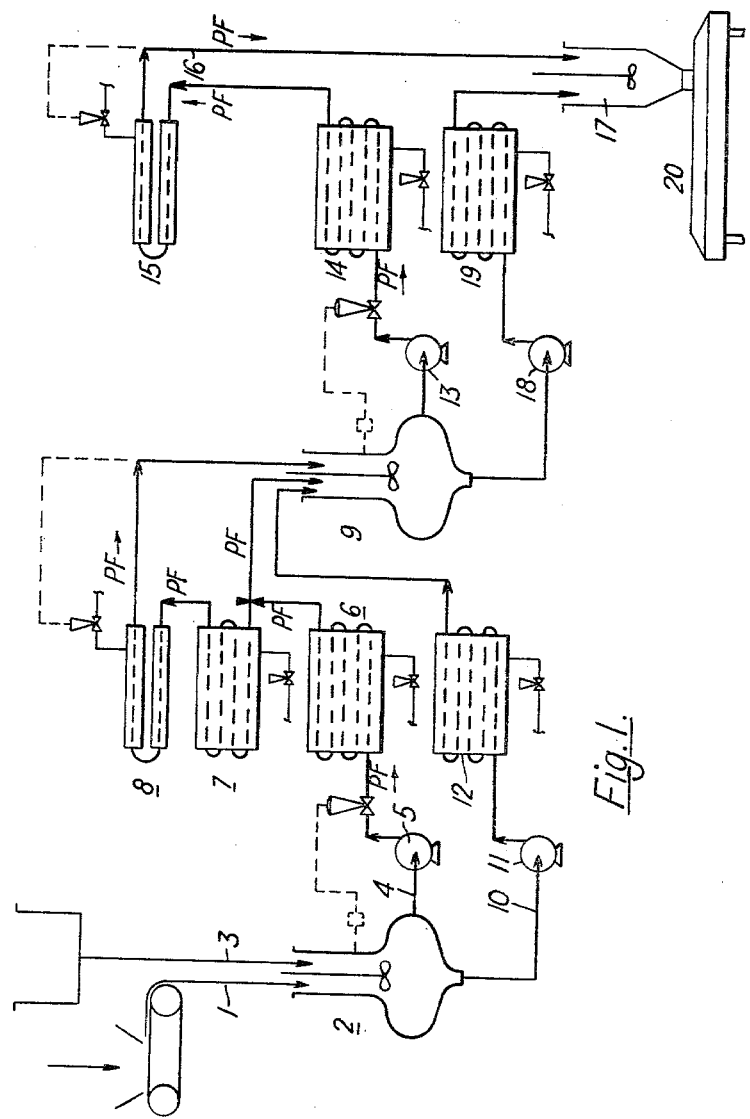

Inventor
David Teignmouth Shore
By Baldwin & Wight
Attorneys

United States Patent Office 3,171,746
Patented Mar. 2, 1965

3,171,746
PRODUCTION OF BREWERS' WORT
David Teignmouth Shore, Banstead, Surrey, England, assignor to The A.P.V. Company Limited
Filed Feb. 5, 1962, Ser. No. 171,211
Claims priority, application Great Britain, Feb. 9, 1961, 4,945/61
7 Claims. (Cl. 99—51)

This invention relates to the production of brewers' wort at the mashing stage in which a reaction is created between water and goods, i.e., ground solids or grist to obtain as a product of the stage a wort which is known as sweet wort: the sweet wort is passed on for further treatment including heating, hopping and fermentation treatment to produce beer of one grade or style or another.

The mashing stage involves proteolytic and saccharification reactions and these reactions are frequently obtained by a decoction process which may be defined as a removal or partition of a portion of the mash, the separate treatment of the removed portion and subsequent remixing to produce a bulk product at a new temperature level. This method of raising the temperature has two aims: firstly in the portion raised to a high temperature (usually the boiling temperature) the starch content is gelatinised and made available for subsequent saccharification, while the other (unheated) portion retains its active enzymes which without separation would have been inactivated by the high temperature heating.

In the modern system in which the mashing operation is a continuous one, i.e., one in which the mixture is in continuous movement towards the succeeding operating stages, saccharification is obtained by passing the liquors from vessel to vessel with a suitable holding time in each.

According to the present invention the supply of the mixture is divided into two parts: one part (termed the "thick" mash) is such that it will flow in a duct as a quiescent plug which moves continuously forward in the duct, and which is subjected to temperature conditions such that proteolysis and saccharification will occur in the plug in its flow, the quiescent form of the plug promoting the process; the other part (termed the "thin" mash) which is rich in enzymes, is decocted and then reunited with the thick mash after the thick mash has completed the proteolytic and saccharification actions and usually after the wort has been subjected to further starch liquefaction stages, the reunited mash flow then passing forward for further treatment. As is known, in a proteolytic reaction, enzymes break proteins down into simpler compounds, such as peptides and amino acids; and in a saccharification reaction, starch is converted to sugars. With respect to the aforesaid proteolytic reaction, there is a proteolytic stand, which is the period of residence or holding in the through flow stream with temperature conditions and solid concentration as required for the proteolytic enzymes to work. As to the aforesaid saccharification reaction, there is a saccharification stand, which is the period of residence or holding in the through flow stream with temperature conditions and solid concentrations as required for saccharifying enzymes to work.

A modified process can be employed when a percentage of the grain feed (say 20% to 40%) is raw starch. In this case two infusion mashes are carried out, the malt mash being held at a suitable temperature for proteolysis say between 120° and 130° F. while the starch mash which may contain a little malt or enzyme material to assist liquefaction is heated to gelatinisation temperatures, i.e., above 180° F. Following the proteolytic stand for the malt mash, the starch slurry, now cooked, joins the malt in a stand at a temperature suitable for saccharification. To ensure a more complete conversion of starch to desirable sugars the decoction system is then employed in the manner previously described.

Figure 2:
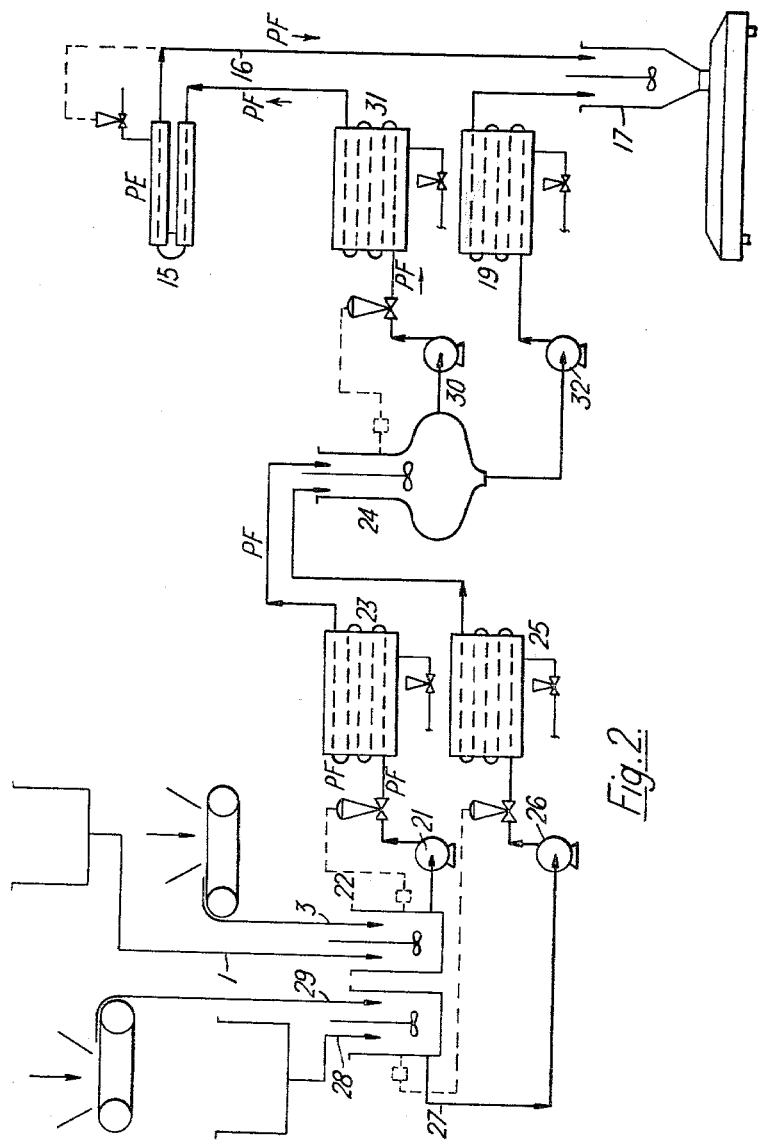

Two installations for carrying the method of this invention into practical effect are shown in the accompanying diagrams, FIGURES 1 and 2.

Referring firstly to FIGURE 1, which indicates a double decoction process, ground solids, e.g. malt, is supplied via a pipe 1 to a mixer-separator 2 to which also liquor is supplied by a pipe 3: the mixer-separator has an output of thick mash via a pipe 4 whence it is delivered by a pump 5 to a heater-holder 6 providing a proteolytic stand: the output of the stand is taken either to a heater-holder 7 constituting a saccharification stand and thence to a heater-boiler 8 promoting the starch liquefaction action or is taken direct to a mixer-separator 9 where it is united with the output of the heater-boiler 8: for an all malt brew the thick mash would normally receive both the proteolytic and saccharification and starch liquefaction reactions before remixing. For a highly modified malt the decoction system may simulate the American two stage infusion mash, the first separation of thin mash rejoining the thick mash after proteolysis, in which case vessels 7 and 8 will not be used.

The mixer-separator 2 also has an output of "thin" malt which is taken via a pipe 10 whence it is delivered by a pump 11 to a temperature control zone, as indicated a heater-holder 12: the output of the heater-holder 12, still as thin mash, is now taken to the mixer-separator 9 where it is reunited with the thick mash.

The separator 9 again divides the flow into a thick mash flow and a thin mash flow: the thick flow is delivered by a pump 13 whence it passes as a quiescent plug to a heater-holder 14 and thence to a heater boiler 15 whence it is delivered by a pipe 16 to a mash collector 17: the thin flow is passed from the mixer-separator 9 by a pump 18 to a heater-holder 19, the output of which is reunited with the thick flow in the collector 17. The combined flow now passes to a rotary filter 20.

For the purpose of obtaining the plug flow the ducts, including those in the components 6, 7, 8, 14 and 15, are such in relation to the consistency of the thick mash that the flow in those ducts will be in the form of a plug which advances, without breaking up, during the processing to which the flow is subjected: the plug-flow is indicated by the reference PF.

FIGURE 2 indicates a two stage infusion process followed by a single decoction process in which the ground solid material, e.g., malt, is supplied by a pipe 3 and the liquor is supplied by a pipe 1: the thick malt flow is taken by a pump 21 from a mash mixer 22, whence it is moved as a plug through a heater-holder 23 in which the proteolytic action occurs: the output of the component 23 is taken to a mixer-separator 24 to which is also taken the output of a starch cooker 25 to which a mixture of starch and water is delivered by a pump 26 which draws its supply from a mixer 27 supplied with liquor and starch respectively via the pipes 28, 29. The output of the mixer-separator 24 is in two parts; one in a thick flow which is moved as a plug by a pump 30 through a heater-holder 31 in which saccharification occurs, the output of this component 31 being taken to a heater-boiler 15 the output of which is taken to a mash collector 17 as before: the other output of the component 24 is a thin mash flow which is moved by a pump 32 to a heater-holder 19 whence the thin flow is reunited with the thick flow, in a mash collector 17 as before.

The ducts forming and connecting the components 23, 31, 15 are such that the mixture advances as a plug as is indicated by the reference PF.

Thus, by this invention, the mash flow is divided into two parts, one of which can be of a consistency such as to enable the simplicity and efficiency of plug flow operation to be obtained for the purpose of carrying out the essential saccharification and proteolytic actions on the advancing plug and ensuring the maximum utilisation of the starch present.

The continuous process of the invention is readily controlled at all stages, as to the rate of flow in each section, also as to the consistency of each phase i.e., the solid/liquor ratio and also the temperature of each phase. For example, the pumps drawing the thin mash from the mixer-separators 9 and 24 will be controlled by the temperature of the subsequent remixing stage and the converter baths are fitted with automatic temperature regulators.

A practical example will now be given for the case of a brewing plant producing 2000 barrels per week by continuous production. Such production would require one quarter of malt, i.e. 336 lbs., per hour: the plug flow sections for proteolytic and saccharification will contain approximately 85% of the starch. The consistency of the mash in plug flow will be 2 lbs. of water per lb. of grist, while in the enzyme rich decocted portion the consistency is 4:1. The tube diameter for plug flow with 336 lbs. is 3" while the decocted thin phase will pass through a series of 1" tubes.

The separator equipment may be of any approved design.

I claim:
1. In the production of brewers' wort at the mashing stage, the method which comprises causing the mixture of ground solids and liquid which are to be treated to move in two separate flows, the first flow being a relatively thick mash and having a larger proportion of starch than the second flow which is a relatively thin mash and is rich in enzymes, in causing the first flow to pass as a quiescent plug through and heating it in a first heating zone to create a proteolytic reaction in the plug, in moving the second flow through and heating it in a second heating zone, and uniting the two flows after the first flow has moved through said first heating zone and said second flow has moved through said second heating zone, the temperature of the flow leaving the second heating zone being controlled to remain below the boiling point of said second flow to preserve the enzymes therein for subsequent enzymic activity in the united flows.

2. The method claimed in claim 1 and which also comprises re-separating the united flow into a third flow and a fourth flow, said third flow having a larger proportion of starch than said fourth flow and said fourth flow being rich in enzymes relatively to said third flow, and causing said third and fourth flows to flow through further heating zones.

3. The method claimed in claim 1 and which also comprises passing the plug flow through a further heating zone to create a saccharification reaction prior to the uniting of the two flows.

4. The method claimed in claim 2 and which also comprises passing the output of the saccharification reaction through an additional heating stage prior to the uniting of the two flows, the additional heating stage increasing the availability of starch for saccharification in the further heating zones.

5. The method claimed in claim 2 and wherein the further heating zone through which said third flow flows is a saccharification reaction zone, the output of the saccharification reaction zone passing to discharge with the other re-separated flow.

6. The method claimed in claim 5 and wherein the output of the saccharification reaction zone is taken prior to discharge through a further heating zone to increase the availability of starch.

7. In the production of brewers' wort from a mixture of ground solids and liquid: the improvement comprising causing the mixture of ground solids and liquid to move in two separate flows, the first flow being a relatively thick mash and having a larger proportion of starch than the second flow, the second flow being a relatively thin mash and being rich in enzymes reactable with starch; causing the first flow to pass as a quiescent plug through at least one first heating zone to promote enzymic reactions and to increase the availability of starch for subsequent enzymic reaction; moving the second flow through a second heating zone where the temperature of the second flow is raised to a point below the boiling point of the second flow and is controlled to preserve the enzymes in said second flow for subsequent enzymic activity with starch in said first flow; and uniting the two flows after the first flow has passed through the said first heating zone and the second flow has passed through said second heating zone, the flows being united at such temperatures and proportions as will favour the subsequent saccharification of starch by reaction with the enzymes in the second flow.

References Cited by the Examiner
UNITED STATES PATENTS

| | | | |
|---|---|---|---|
| 732,350 | 6/03 | Henius | 99—278 |
| 2,240,338 | 4/41 | Locke | 99—51 |
| 2,309,989 | 2/43 | Saltzman | 99—278 |
| 2,414,669 | 6/47 | Reich | 99—51 |
| 2,442,806 | 6/48 | Gluek | 99—51 |
| 2,650,164 | 8/53 | Franck | 99—52 |
| 2,894,841 | 7/59 | Compton et al. | 99—52 |
| 3,082,090 | 3/63 | Dummett et al. | 99—52 |

A. LOUIS MONACELL, *Primary Examiner.*

TOBIAS E. LEVOW, *Examiner.*